United States Patent [19]
Blackburn et al.

[11] Patent Number: 5,920,176
[45] Date of Patent: Jul. 6, 1999

[54] C-DUMP TOPOLOGY NOISE REDUCTION

[75] Inventors: Scott E. Blackburn, Temperance; Sergei F. Kolomeitsev, Saline, both of Mich.

[73] Assignee: Dana Corporation, Toledo, Ohio

[21] Appl. No.: 09/136,162

[22] Filed: Aug. 18, 1998

[51] Int. Cl.[6] .................................................. H02P 1/46

[52] U.S. Cl. ......................... 318/701; 318/254; 318/138; 318/439

[58] Field of Search .................................. 318/701, 254, 318/138, 439

[56] References Cited

U.S. PATENT DOCUMENTS

| | | | |
|---|---|---|---|
| 4,520,300 | 5/1985 | Fradella | 318/603 |
| 4,760,315 | 7/1988 | Nanae et al. | 318/254 |
| 4,760,320 | 7/1988 | Tsugita | 318/696 |
| 4,959,601 | 9/1990 | Kikugawa | 318/696 |
| 5,119,000 | 6/1992 | Schultz | 318/254 |
| 5,402,045 | 3/1995 | Mori | 318/757 |
| 5,446,359 | 8/1995 | Horst | 318/701 |
| 5,461,295 | 10/1995 | Horst | 318/701 |
| 5,552,685 | 9/1996 | Young et al. | 318/254 |
| 5,569,989 | 10/1996 | Acquaviva | 318/254 |
| 5,589,752 | 12/1996 | Iwasaki et al. | 318/701 |
| 5,602,452 | 2/1997 | Underhill | 318/439 |

OTHER PUBLICATIONS

"Development of a Unipolar Converter for Variable Reluctance Motor Drives", Mehrdad Ehsani, James T. Bass, Timothy J.E. Miller, and Robert L. Steigerwald, IEEE Transactions on Industry Applications, vol. IA–23, No. 3, pp. 545–552, May/Jun. 1987.

*Primary Examiner*—Karen Masih
*Attorney, Agent, or Firm*—Dykema Gossett PLLC

[57] ABSTRACT

A method and circuit for controlling a switched reluctance motor are provided. The method includes the steps of controlling a current in a phase coil of a motor phase of the motor during an active stage of the motor phase and controlling the current in the phase coil during an inactive stage of the motor phase. The latter step includes the substep of increasing the level of current in the phase coil for a predetermined period of time during the inactive stage of the motor phase. By increasing the current level during the inactive stage, the rate of current dissipation is reduced, thereby reducing acoustic noise. A circuit in accordance with the present invention includes a pair of one-shot circuits connected together in series and responsive to the end of the active stage of the motor phase. The second one-shot circuit generates an output signal that closes a switch connected to a phase coil of a motor phase of the motor for a predetermined period of time during the inactive stage of the motor phase. Closing the switch causes a level of current in the phase coil to increase during the inactive stage of the motor phase, thereby slowing the rate of current dissipation and reducing acoustic noise.

20 Claims, 5 Drawing Sheets

C-DUMP TOPOLOGY NOISE REDUCTION

BACKGROUND OF THE INVENTION

1. Field of the Invention

This invention relates to switched reluctance motors, and, more particularly, to a method and a circuit for controlling a switched reluctance motor whereby acoustic noise generated by the motor is reduced.

2. Disclosure of Related Art

A conventional switched reluctance motor (SRM) includes a stator having a plurality of pairs of diametrically opposed stator poles and a rotor having a plurality of pairs of diametrically opposed rotor poles. Windings or coils are typically disposed about the stator poles and the windings around any two diametrically opposed stator poles may be connected in series or in parallel to define one motor phase of the multiphase SRM. The windings associated with a motor phase may be referred to as a phase coil. By generating current through the phase coil, magnetic fields are established about the stator poles and a torque is produced that attracts a pair of rotor poles into alignment with the stator poles. The current in the phase coils is generated in a predetermined sequence in order to produce a constant torque on the rotor. The period during which current is provided to the phase coil—and the rotor poles are brought into alignment with the stator poles—is known as the "active stage" or conduction interval of the motor phase. At a certain point—either as the rotor poles become aligned with the stator poles or at some point prior thereto—it becomes desirable to commutate the current in the phase coil to prevent a negative or braking torque from acting on the rotor poles. Once this "commutation point" is reached, current is no longer generated in the phase coil and the current is allowed to dissipate from the phase coil. The period during which current is allowed to dissipate from the phase coil is known as the "inactive stage" of the motor phase.

Conventional SRMs generate a high and undesirable level of acoustic noise in comparison to other types of motors. One source of this acoustic noise is the deformation of the stator and the rotor that occurs when the phase coils are energized and deenergized. In particular, when the phase coils are energized, the magnetic forces that are generated tend to "ovalize" the rotor and the stator. When the phase coils are deenergized, the rotor and the stator return to their original shape and relatively high levels of acoustic noise are generated.

One conventional method for reducing acoustic noise has been to slow the dissipation of current in each phase coil during the inactive stage of the motor phase so as to produce a less abrupt change in magnetic force, and therefore, the shape of the SRM. This method has previously been implemented in SRMs having a two-switch per phase topology (i.e., one switch connected to either end of the phase coil) by keeping one of the switches closed for a period of time during the inactive stage of the motor phase. This produces a two-stage decay in which the current in the phase coil is dissipated slowly through the control circuit during the first stage and the current is then returned quickly to the power supply during the second stage when the remaining closed switch is opened. The two-switch per phase topology is a relatively expensive switching topology, however. Moreover, as described in commonly assigned U.S. Pat. No. 5,742,139, the entire disclosure of which is incorporated herein by reference, this method has not adequately reduced the acoustic noise generated in switched reluctance motors because it fails to reduce acoustic vibrations resulting from the interaction of multiple motor phases.

There is thus a need for a method and circuit for controlling a switched reluctance motor that will minimize or eliminate one or more of the above-mentioned deficiencies.

SUMMARY OF THE INVENTION

The present invention provides a method and a circuit for controlling a motor such as a switched reluctance motor.

An object of the present invention is to provide a method and a circuit for controlling a motor whereby acoustic noise generated by the motor is reduced.

Another object of the present invention is to provide a method and a circuit for controlling a motor and reducing acoustic noise that enable the use of less expensive switching topologies as compared to conventional methods and circuits.

Yet another object of the present invention is to provide a method and a circuit for controlling a motor and reducing acoustic noise that can be implemented and operated less expensively and more efficiently than conventional methods and circuits.

A method for controlling a motor in accordance with the present invention includes the step of controlling a current in a phase coil of a motor phase of the motor during an active stage of the motor phase. In particular, a switch connected to the phase coil is closed during the active stage of the motor phase, thereby allowing the level of current in the phase coil to increase. The method further includes the step of controlling the current in the phase coil during an inactive stage of the motor phase. In particular, the above-mentioned switch is first opened for a predetermined period of time during the inactive stage of the motor phase to decrease the level of current in the phase coil. The switch is then closed again for another predetermined period of time to increase the level of current in the phase coil. Finally, the switch is again opened to fully dissipate the current from the phase coil. By increasing the current level for a period of time during the inactive stage of the motor phase, the rate of current dissipation in the phase coil is reduced—thereby reducing acoustic noise.

A circuit for controlling a motor in accordance with the present invention includes a controller that generates a phase control signal. The circuit also includes a first one-shot circuit that generates a first output signal responsive to the phase control signal and a second one-shot circuit that generates a second output signal responsive to the first output signal. The circuit further includes a logic gate that generates a drive signal responsive to the phase control signal and the second output signal. In a constructed embodiment, the logic gate is an OR gate. Finally, the circuit includes a switch connected to a phase coil of a motor phase of the motor and responsive to the drive signal. During an active stage of the motor phase, the phase control signal—and consequently the drive signal—assume a high logic level, thereby closing the switch and causing the level of current in the phase coil to increase. At the beginning of the inactive stage, the phase control signal and the drive signal transition to a low logic level, thereby opening the switch and causing the level of current in the phase coil to decrease. The falling edge of the phase control signal causes the first output signal of the first one-shot circuit to assume a high logic level for a first predetermined period of time. After the first predetermined period of time, the first output signal returns to a low logic level and causes the second output signal of the second one-shot circuit to assume a high logic level. Because the second output signal is provided to the OR gate, the drive signal also assumes a high logic level, thereby closing the switch again and causing the level of current in the phase coil to increase. The second output signal and the drive signal remain at the high logic level for a second predetermined period of time. By closing the switch and increasing the level of current in the phase coil for a predetermined period of time during the inactive stage of the motor phase, the rate of current dissipation in the phase coil is reduced, thereby reducing acoustic noise.

A circuit and method in accordance with the present invention are less expensive and less complex than conventional means for reducing acoustic noise because the inventive circuit and method do not require the use of a microprocessor. The inventive method and circuit are also particularly adapted for use with switching topologies incorporating only a single switch per motor phase (e.g., the C-Dump topology). As a result, motors and control circuits that use the inventive method and circuit can be implemented and operated less expensively and more efficiently than conventional motors and control circuits.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
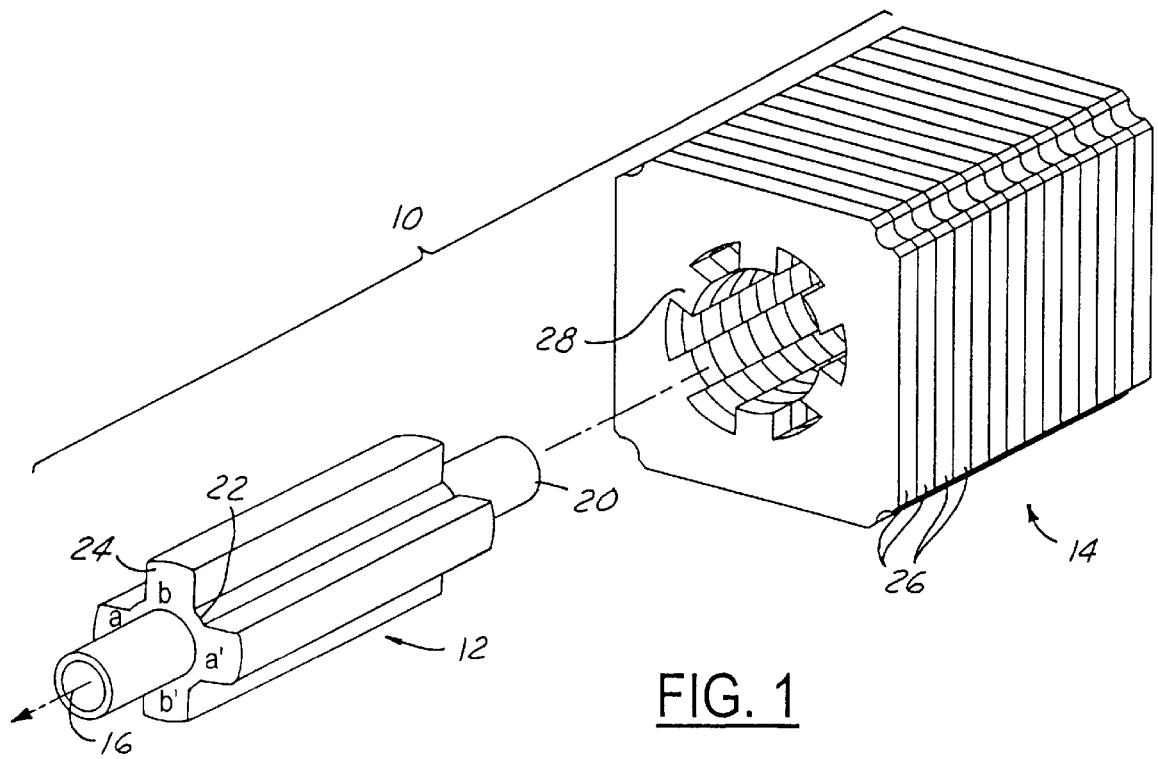
FIG. 1 is an exploded perspective view of a conventional switched reluctance motor.
Figure 2:
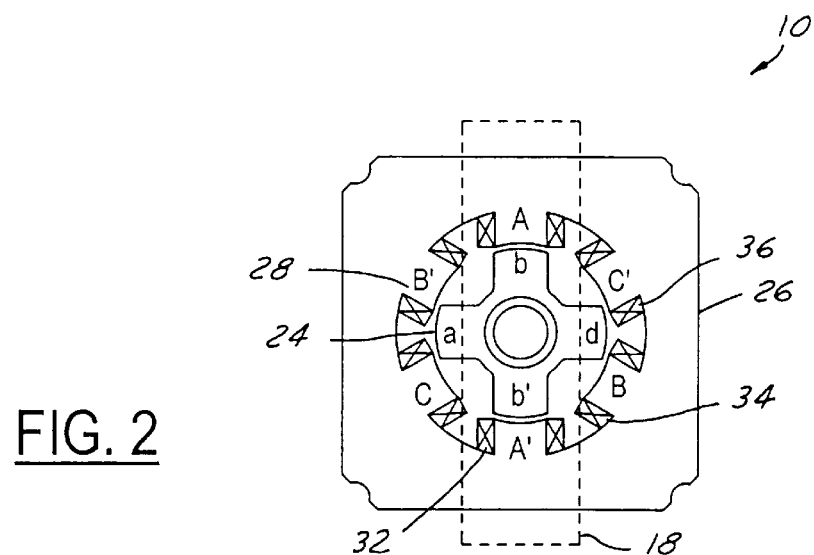
FIG. 2 is a cross-sectional view of a conventional switched reluctance motor.

Referring now to the drawings wherein like reference numerals are used to identify identical components in the various views, FIGS. 1 and 2 illustrate a conventional switched reluctance motor 10. Although the illustrated motor comprises a switched reluctance motor, it should be understood that the invention as disclosed herein could be applied to other motors as is known in the art. Motor 10 includes a rotor assembly 12 and a stator assembly 14, both of which may be centered about an axis 16. A representative motor phase 18 is indicated by a dashed-line box, while the other two motor phases are not shown. Although the illustrated embodiment includes three motor phases 18, it will be understood by those skilled in the art that the number of motor phases 18 may vary.

Rotor assembly 12 is provided to move a load (not shown) connected to rotor assembly 12. Assembly 12 includes a shaft 20 and a rotor 22 disposed about shaft 20. Shaft 20 is provided to engage either the load or another means for engaging the load. Shaft 20 extends longitudinally along axis 16 and may be centered about axis 16. Rotor 22 is provided to impart rotation to shaft 20 and is capable of clockwise or counter-clockwise rotation. Rotor 22 may be made from a material having a relatively low magnetic reluctance, such as iron. Rotor 22 may be centered about axis 16 and may include a spline or key (not shown) configured to be inserted within a keyway (not shown) in shaft 20. Rotor 22 includes a plurality of radially outwardly extending rotor poles 24 configured as diametrically opposed rotor pole pairs a–a', b–b'. Each of poles 24 is generally rectangular in cross-section and may include one or more radially outwardly extending teeth as is known in the art. It will be understood by those skilled in the art that the number of poles 24 of rotor 22 may vary.

Stator assembly 14 is provided produce a torque to cause rotation of rotor assembly 12. Stator assembly 14 may comprise a plurality of laminations 26 that are formed from a material, such as iron, having a relatively low magnetic reluctance. Assembly 14 includes a plurality of radially inwardly extending poles 28 configured as diametrically opposed stator pole pairs A–A', B–B', C—C'. Each pair of stator poles 28 is provided to attract a corresponding pair of rotor poles 24 of rotor assembly 12 and thereby cause rotation of rotor assembly 12. Poles 28 are generally rectangular in cross-section and may include one or more radially inwardly extending teeth (not shown) as is known in the art. Poles 28 may extend along the axial length of stator assembly 14 and define a bore 30 that is adapted to receive rotor assembly 12. It will be understood by those in the art that the number of stator poles 28 may vary.

Rotation of rotor assembly 12 is produced by initiating, and later commutating, in a predetermined sequence, conduction cycles in phase coils 32, 34, 36 surrounding each stator pole pair. Phase coils 32, 34, 36 are formed by connecting, in series or in parallel, windings on diametrically opposed stator poles 28. As one of phase coils 32, 34, 36 begins to conduct current, the nearest rotor pole pair is magnetically attracted towards the stator pole pair around which the energized phase coil is wound. By initiating and commutating conduction cycles in phase coils surrounding consecutive stator pole pairs, a relatively constant torque can be produced.

Figure 3:
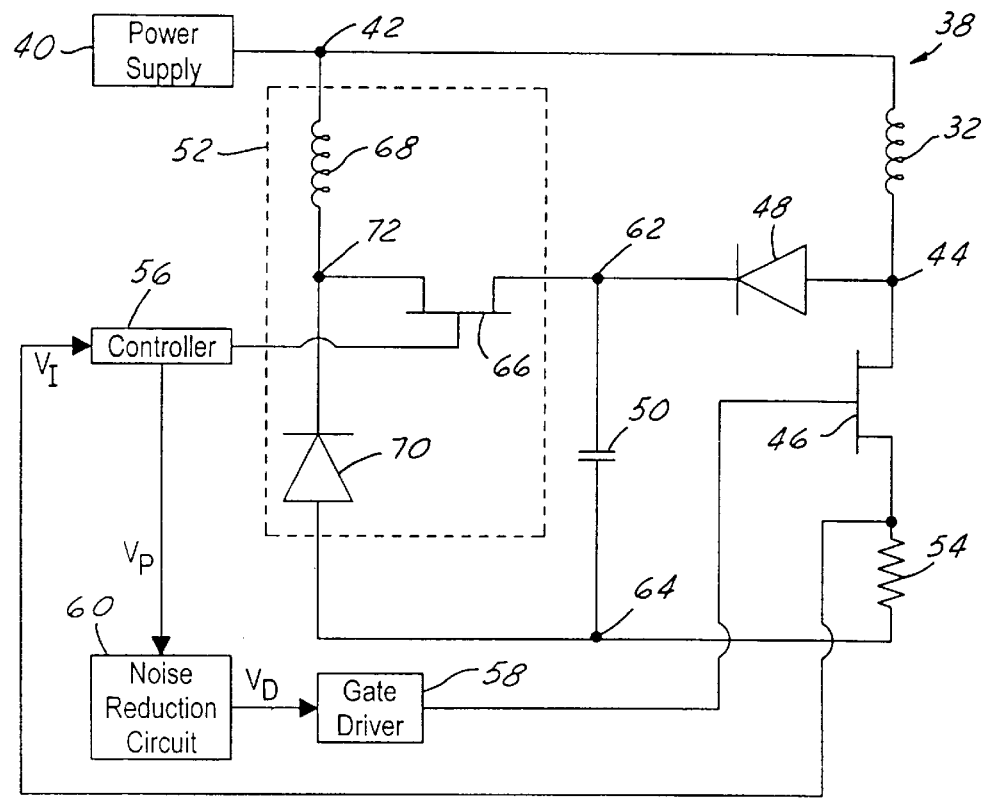
FIG. 3 is a combination schematic and block diagram illustrating a circuit in accordance with the present invention.

Referring now to FIG. 3, a circuit 38 for controlling motor 10 in accordance with the present invention is illustrated. Circuit 38 may include a phase coil 32 having a first end connected to a power supply 40 through a node 42 and a second end connected to a node 44. Circuit 38 may also include a switch 46 for controlling a current in phase coil 32 of motor 10, a diode 48, means, such as capacitor 50, for storing energy dissipated from coil 32, and a recovery circuit 52 that returns the energy stored by capacitor 50 to power supply 40. These components form a conventional C-Dump switching topology for motor 10. The C-Dump switching topology is advantageous because it uses a single switch (i.e., switch 46) to control the current level in the phase coil and is therefore relatively inexpensive as compared to other conventional switching topologies. Circuit 38 may also include a current sensor, such as sensing resistor 54, a controller 56, and a conventional gate driver 58. In accordance with the present invention, circuit 38 also includes a noise reduction circuit 60 that will be described in greater detail hereinbelow. Circuit 38 represents an equivalent circuit for one motor phase 18 of motor 10. It should be understood, however, that portions of circuit 38, such as capacitor 50, recovery circuit 52, and controller 56, may form part of additional motor phases 18.

Switch 46 is provided as a means for controlling current in coil 32 of motor phase 18 during an active stage of motor phase 18. Switch 46 also forms one part of a means for controlling current in coil 32 during an inactive stage of motor phase 18. Switch 46 is conventional in the art and may take any of a plurality of forms well known in the art. For example, switch 46 may comprise a MOSFET. Switch 46 may be disposed between sensing resistor 54 and node 44 and is responsive to a drive signal VD generated by noise reduction circuit 60.

Diode 48 is provided to direct the current, or electrical energy, that dissipates from coil 32 when switch 46 is opened to capacitor 50. Diode 48 is conventional in the art. Diode 48 may have an anode connected to node 44 and a cathode connected to a node 62.

Capacitor 50 is provided to store the electrical energy dissipated from coil 32 when switch 46 is opened. Capacitor 50 is conventional in the art and may have a first plate connected to node 62 and a second plate connected to a node 64.

Recovery circuit 52 is provided to return the energy stored in capacitor 50 to power supply 40. Circuit 52 may include a switch 66, a coil 68, and a diode 70. Switch 66 is provided to discharge energy stored in capacitor 50 into coil 68 and is connected between node 62 and a node 72. Switch 66 is conventional in the art and may take on any of a plurality of forms well known in the art. For example, switch 66 may comprise a MOSFET. Coil 68 is provided to store the energy discharged from capacitor 50 and is also conventional in the art. Coil 68 may have a first end connected to power supply 40 at node 42 and a second end connected to node 72. Diode 70 is provided to direct the energy stored in coil 68 to power supply 40 and is also conventional in the art. Diode 70 may have an anode connected to node 64 and a cathode connected to node 72. Switch 66 is controlled by a control signal generated by controller 56. Closing switch 66 causes the energy stored in capacitor 50 to discharge into coil 68. Thereafter, opening switch 66 causes the energy stored in coil 68 to freewheel throughout circuit 38 and return to power supply 40.

Sensing resistor 54 is provided to measure a level of current in coil 32 and generates a current indicative signal VI that is indicative of the level of current in coil 32. Resistor 54 is conventional in the art. Resistor 54 is connected in series with switch 46 and has one end connected to node 64. It should be understood by those skilled in the art that sensing resistor 54 represents just one possible current sensor for use in the present invention. A variety of current sensors could be employed in the present invention, including, for example, Hall effect current sensors.

Controller 56 is provided to initiate and commutate the conduction cycle in each motor phase 18 of motor 10. Controller 56 is also provided to control recovery circuit 52. Controller 56 is conventional in the art and may comprise either discrete circuits or a programmable microcontroller. Controller 56 initiates and commutates conduction cycles in each of the motor phases 18 by generating phase control signals that are used to control switches in each motor phase 18. In the illustrated embodiment, controller 56 generates a phase control signal $V_P$ that is supplied to noise reduction circuit 60. As described in greater detail hereinbelow, circuit 60 generates a drive signal $V_D$ responsive to phase control signal $V_P$ that is used to control switch 46 and the current in coil 32. Controller 56 controls recovery circuit 52 by generating a control signal used to selectively open and close switch 66 of recovery circuit 52.

Figure 4:
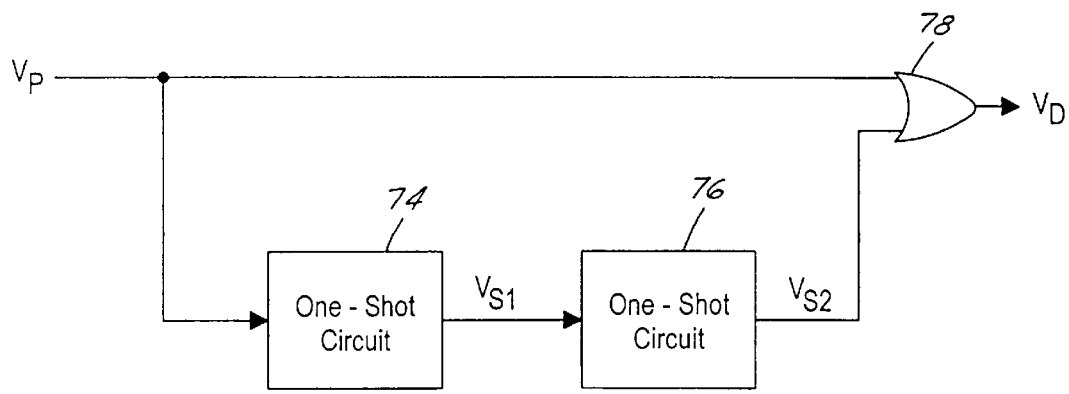
FIG. 4 is a combination schematic and block diagram illustrating the noise reduction circuit block of FIG. 3.

Referring now to FIG. 4, noise reduction circuit 60 will be described in greater detail. Noise reduction circuit 60 is provided to control the current in coil 32 of motor phase 18 during an inactive stage of motor phase 18. In particular, circuit 60 generates a drive signal $V_D$ that is used to control switch 46 and thereby control a level of current within coil 32. Circuit 60 may include one-shot circuits 74, 76 and a logic gate 78.

One-shot circuits 74, 76 are provided as part of a means for controlling current in coil 32 of motor phase 18 during an inactive stage of motor phase 18. Circuits 74, 76 are conventional in the art and may comprise monostable multivibrators. Circuit 74 may be configured to generate an output signal $V_{S1}$ that transitions from a low logic level to a high logic level responsive to the transition of phase control signal $V_P$ from a high logic level to a low logic level (i.e., responsive to the falling edge of phase control signal $V_P$) at the end of the active stage of motor phase 18. Signal $V_{S1}$ remains at the high logic level for a predetermined period of time $t_1$. Circuit 76 is configured to generate an output signal $V_{S2}$ that transitions from a low logic level to a high logic level responsive to the transition of signal $V_{S1}$ from a high logic level to a low logic level at the end of time $t_1$. Signal $V_{S2}$ remains at the high logic level for a predetermined period of time $t_2$.

Logic gate 78 is provided to generate a drive signal $V_D$ used to control switch 46 responsive to phase control signal $V_P$ and output signal $V_{S2}$. Gate 78 is conventional in the art and comprises an OR gate in the illustrated embodiment. It should be understood, however, that other gate configurations may be implemented without departing from the spirit of the present invention.

Figure 5A:
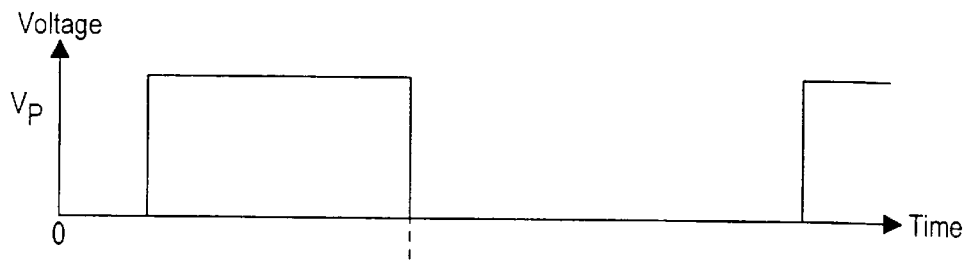
FIGS. 5A–E are timing diagrams illustrating voltage and current levels in the circuit of FIG. 3 over time.
Figure 5B:
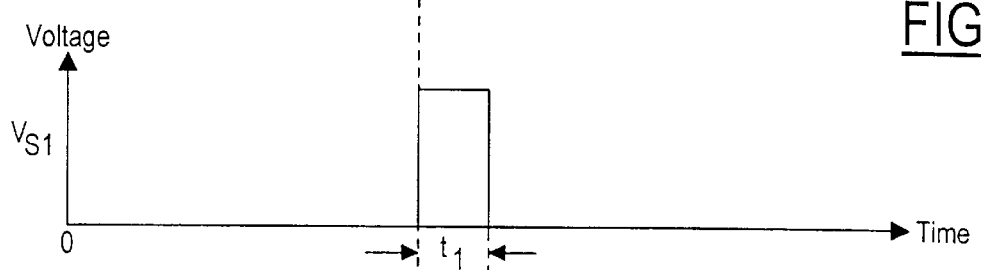
Figure 5C:
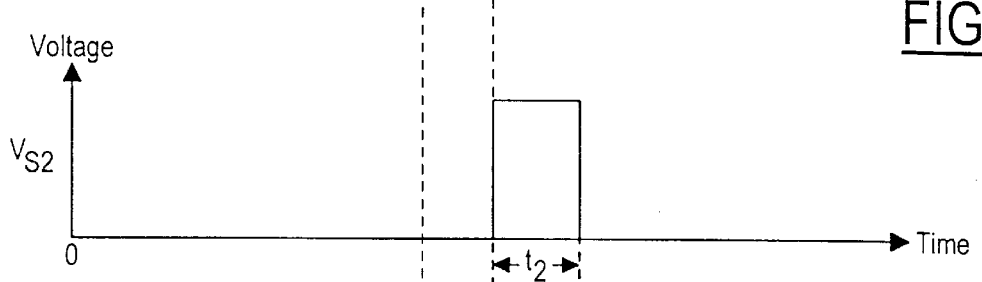
Figure 5D:
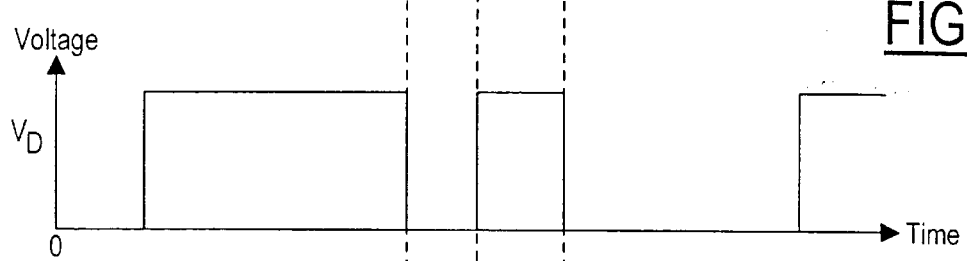
Figure 5E:
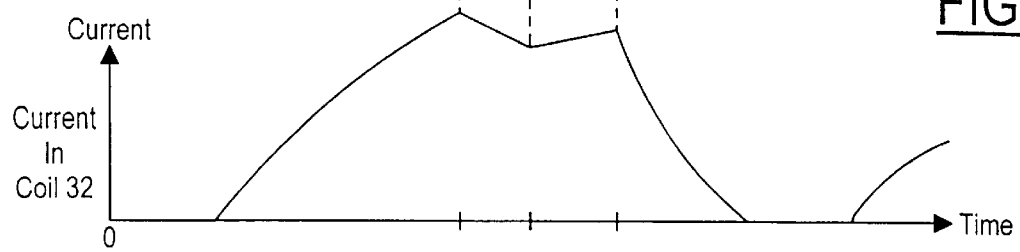
Figure 7A:
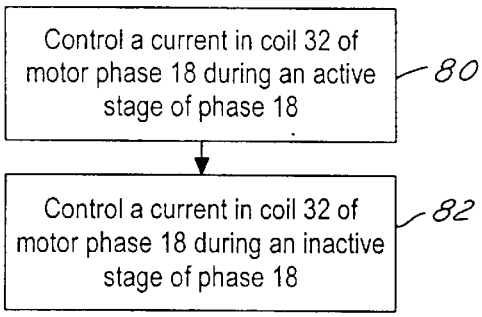
FIGS. 7A–D are flowchart diagrams illustrating a method in accordance with the present invention.
Figure 7B:
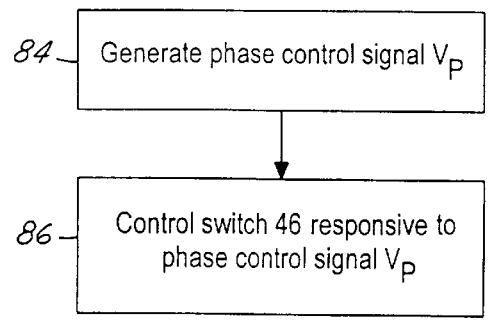

Referring now to FIGS. 5A–E and 7A–C, a method in accordance with the present invention will be described. As shown in FIG. 7A, a method in accordance with the present invention may include the step 80 of controlling a current in a phase coil 32 of a motor phase 18 of motor 10 during an active stage of phase 18. Referring now to FIG. 7B, step 80 may include the substeps 84, 86 of generating a phase control signal $V_P$ and controlling switch 46 responsive thereto. As mentioned hereinabove, phase control signal $V_P$ may be generated by controller 56. The active stage of motor phase 18 begins when phase control signal $V_P$ transitions from a low logic level to a high logic level. As shown in FIGS. 5A and 5D, drive signal $V_D$ transitions from a low logic level to a high logic level responsive to the transition of phase control signal $V_P$. In response to the transition of drive signal $V_D$, switch 46 closes and the level of current in coil 32 begins to increase as shown in FIG. 5E.

Figure 7C:
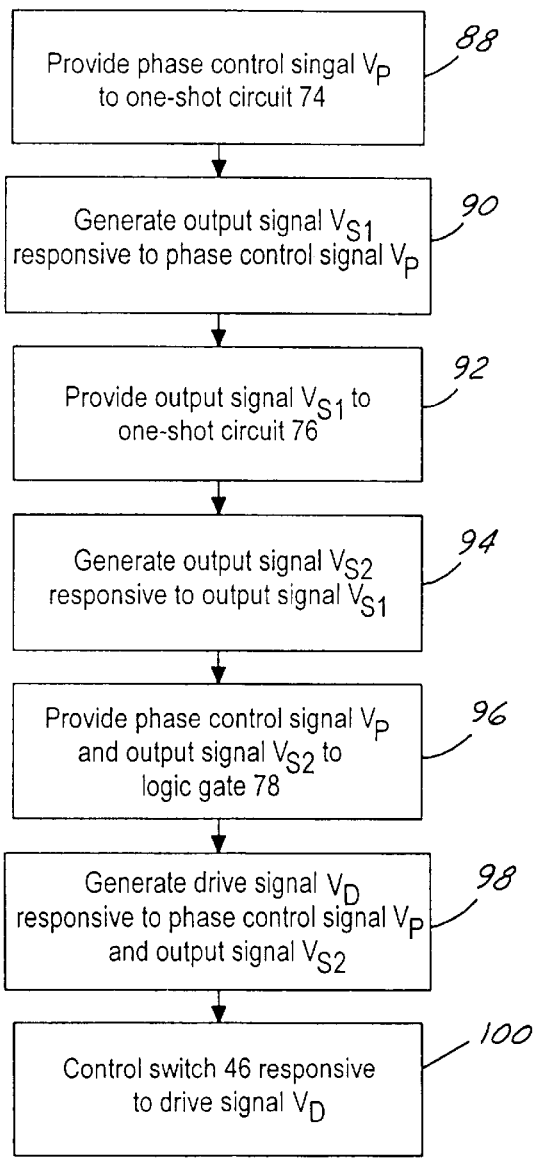
Figure 7D:
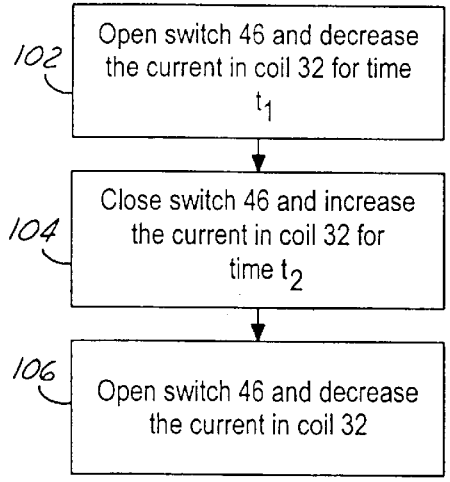

Referring again to FIG. 7A, a method in accordance with the present invention may also include the step 82 of controlling a current in phase coil 32 during an inactive stage of phase 18. Referring now to FIG. 7C, step 82 may include the substeps 88, 90 of providing phase control signal $V_P$ to one-shot circuit 74 and generating an output signal $V_{S1}$ responsive thereto. Referring to FIG. 5A, the inactive stage of motor phase 18 begins when phase control signal $V_P$ transitions from a high logic level to a low logic level. The transition of phase control signal $V_P$ causes output signal $V_{S1}$ of one-shot circuit 74 to transition from a low logic level to a high logic level as shown in FIG. 5B. Signal $V_{S1}$ remains at the high logic level for a predetermined period of time $t_1$.

Referring again to FIG. 7B, step 82 may also include the substeps 92, 94 of providing output signal $V_{S1}$ to one-shot circuit 76 and generating an output signal $V_{S2}$ responsive thereto. Referring to FIG. 5B, output signal $V_{S1}$ transitions from a high logic level to a low logic level after time $t_1$. The transition of output signal $V_{S1}$ causes output signal $V_{S2}$ of one-shot circuit 76 to transition from a low logic level to a high logic level as shown in FIG. 5C. Signal $V_{S2}$ remains at the high logic level for a predetermined period of time $t_2$.

Referring again to FIG. 7B, step 82 may also include the substep 96 of generating a drive signal $V_D$ responsive to phase control signal $V_P$ and output signal $V_{S2}$. As mentioned hereinabove, phase control signal $V_P$ and output signal $V_{S2}$ may be provided to logic gate 78 which in turn generates drive signal $V_D$. As shown in FIGS. 5A, 5C, and 5D, drive signal $V_D$ assumes a high logic level whenever phase control signal $V_P$ or output signal $V_{S2}$ assume a high logic level.

Referring again to FIG. 7B, step 82 may finally include the substep 100 of controlling switch 46 responsive to phase control signal $V_P$ and output signal $V_{S2}$. As mentioned hereinabove, switch 46 is directly responsive to a drive signal $V_D$ that is generated responsive to phase control signal $V_P$ and output signal $V_{S2}$. Referring now to FIG. 7C, substep 100 may include the substep 102 of opening switch 46 for a predetermined period of time $t_1$ and decreasing a level of current in coil 32 over time $t_1$. Referring to FIGS. 5A and D, drive signal $V_D$ transitions to a low logic level when phase control signal $V_P$ transitions to a low logic level at the end of the active stage of phase 18. In response to the transition of drive signal $V_D$, switch 46 is opened and the level of current in coil 32 decreases for a predetermined period of time $t_1$.

Referring again to FIG. 7C, substep 100 of may further include the substep 104 of closing switch 46 for a predetermined period of time $t_2$ and increasing the level of current in coil 32 over time $t_2$. Referring to FIGS. 5C and 5D, drive signal $V_D$ transitions to a high logic level responsive to the transition of output signal $V_{S2}$ to a high logic level at the end of time period $t_1$. In response to the transition of drive signal $V_D$, switch 46 closes and the level of current in coil 32 increases for a predetermined period of time $t_2$.

Referring again to FIG. 7C, substep 100 may finally include the substep 106 of opening switch 46 after time $t_2$ and decreasing the level of current in coil 32. As shown in FIGS. 5C and 5D, drive signal $V_D$ transitions to a low logic level responsive to the transition of output signal $V_{S2}$ to a low logic level after time $t_2$. In response to the transition of drive signal $V_D$, switch 46 opens again and the level of current in coil 32 decreases.

A method and circuit in accordance with the present invention represent an improvement over conventional methods and circuits for controlling a switched reluctance motor and reducing acoustic noise because the inventive method and circuit are less expensive and less complex then conventional methods and circuits. For example, the inventive method and circuit do not require the use of a microprocessor. The inventive method and circuit also represent an improvement over conventional methods and circuits for reducing acoustic noise because the inventive method and circuit can be implemented with less expensive switching topologies as compared to conventional methods and circuits. In particular, the inventive method and circuit can be implemented using switching topologies having only a single switch per motor phase (e.g., the C-Dump switching topology). It should be understood, however, that the application of the inventive method and circuit is not limited to such a topology.

A method and circuit in accordance with the present invention also provides another significant advantage. As described in commonly assigned U.S. Pat. No. 5,742,139, it has been found that conventional means for reducing acoustic noise in switched reluctance motors fail to reduce acoustic noise to a sufficient level because they fail to account for acoustic vibration caused by the interaction of multiple motor phases. As described in U.S. Pat. No. 5,742,139, a novel method for reducing these acoustic vibrations is to vary the current profile—and, in particular, the inactive stage (or decaying section) of the current profile—of the individual motor phases. This variation will act to cancel much of the acoustic vibration resulting from the interaction of the motor phases.

Figure 6A:
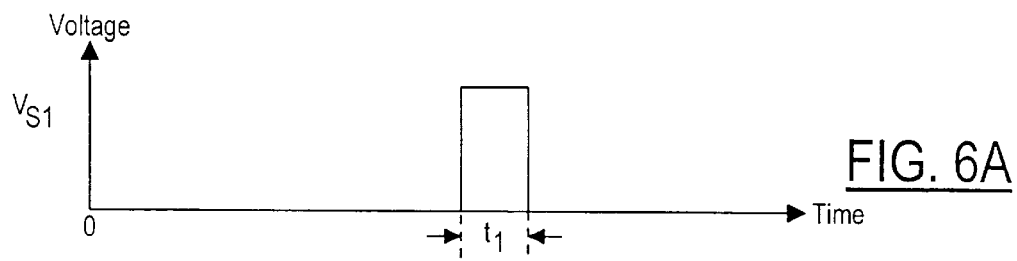
FIGS. 6A–F are timing diagrams illustrating a method in accordance with the present invention.
Figure 6B:
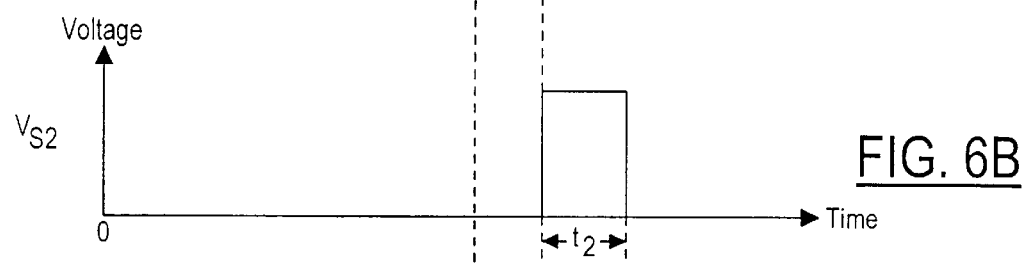
Figure 6C:
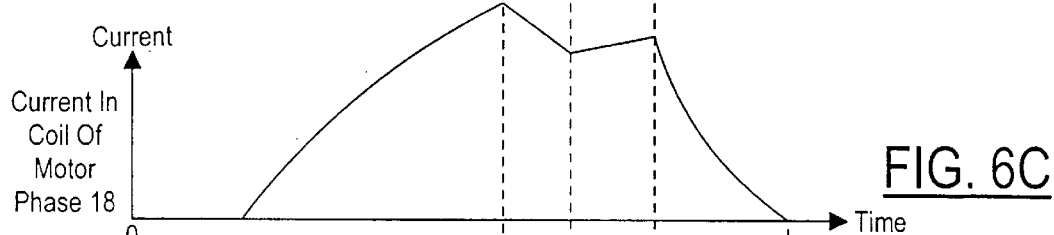
Figure 6D:
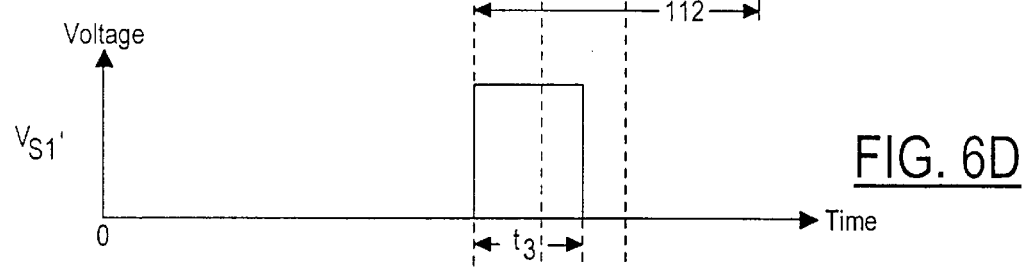
Figure 6E:
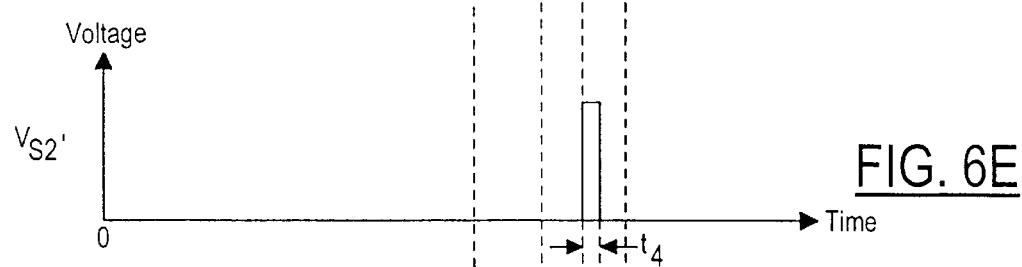
Figure 6F:
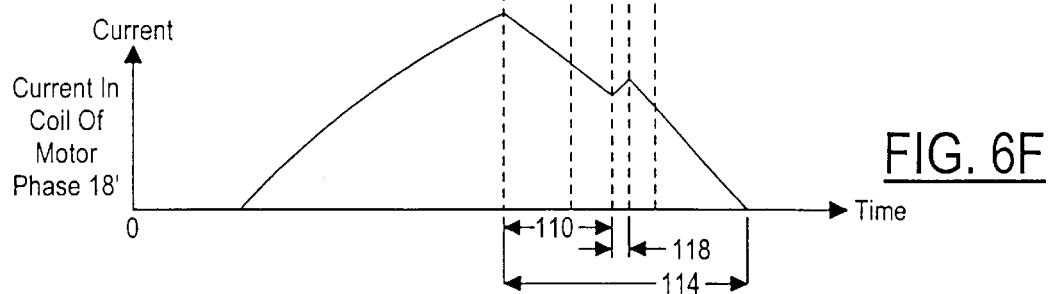

A method and circuit in accordance with the present invention provide an efficient means for varying the current profiles of multiple motor phases 18 in order to further reduce acoustic noise. Each of the one-shot circuits in the various motor phases may be individually configured so as to generate output signals that remain at a predetermined logic level for different predetermined periods of time. As a result, the current profiles of the respective motor phases can be made to vary. As shown in FIGS. 6A and 6D, one-shot circuit 74 of motor phase 18 generates an output signal $V_{S1}$ that attains a high logic level for a predetermined period of time $t_1$ while a one-shot circuit 74' of a second motor phase 18' may generate an output signal $V_{S1}$, that attains a high logic level for a predetermined period of time $t_3$. In the illustrated embodiment time $t_1$ is different than time $t_3$. As a result, the first parts 108, 110 of the inactive stages 112, 114, respectively, of the current profiles of motor phases 18 and 18' will vary as shown in FIGS. 6C and 6F. As shown in FIGS. 6B and 6E, one-shot circuit 76 of first motor phase 18 generates an output signal $V_{S2}$ that attains a high logic level for a predetermined period of time $t_2$ while one-shot circuit 76' of a second motor phase 18' generates an output signal $V_{S2}$, that attains a high logic level for a predetermined period of time $t_4$. In the illustrated embodiment time $t_2$ is different than time $t_4$. As a result, the second parts 116, 118, of the inactive stages 112, 114, respectively, of the current profiles of motor phases 18 and 18' will also vary as shown in FIGS. 6C and 6F.

While the invention has been particularly shown and described with reference to the preferred embodiments thereof, it is well understood by those skilled in the art that various changes and modifications can be made in the invention without departing from the spirit and scope of the invention.

We claim:

1. A method for controlling a motor, comprising the steps of:

controlling a current in a first phase coil of a first motor phase of the motor during an active stage of said first motor phase; and, controlling said current in said first phase coil during an inactive stage of said first motor phase wherein said current in said first phase coil increases for a first predetermined period of time during said inactive stage of said first motor phase.

2. The method of claim 1 wherein said step of controlling said current in said first phase coil during an inactive stage of said first motor phase includes the substeps of:

decreasing a level of said current in said first phase coil for a second predetermined period of time; and, increasing said level of said current for said first predetermined period of time.

3. The method of claim 2 wherein said second predetermined period of time occurs before said first predetermined period of time.

4. The method of claim 2 wherein said step of controlling said current in said first phase coil during an inactive stage of said first motor phase further includes the substep of decreasing said level of said current in said first phase coil after said first and second predetermined periods of time.

5. The method of claim 1 wherein said step of controlling said current in said first phase coil during an inactive stage of said first motor phase includes the substeps of:

providing a phase control signal to a first one-shot circuit;

generating a first output signal from said first one-shot circuit responsive to said phase control signal;

providing said first output signal to a second one-shot circuit;

generating a second output signal from said second one-shot circuit responsive to said first output signal; and, controlling a switch connected to said first phase coil responsive to said phase control signal and said second output signal.

6. The method of claim 5, wherein said step of controlling said current in said first phase coil during an inactive stage of said first motor phase further includes the steps of:

providing said phase control signal and said second output signal to a logic gate; and, generating a drive signal, said switch responsive to said drive signal.

7. The method of claim 5 wherein said substep of controlling said switch comprises the substeps of:

opening said switch for a second predetermined period of time; and, closing said switch for said first predetermined period of time.

8. The method of claim 7 wherein said second predetermined period of time occurs before said first predetermined period of time.

9. The method of claim 7 wherein said substep of controlling said switch further comprises the substep of opening said switch after said first and second predetermined periods of time.

10. The method of claim 1, further comprising the steps of:

controlling a current in a second phase coil of a second motor phase of the motor during an active stage of said second motor phase; and, controlling a current in said second phase coil during an inactive stage of said second motor phase wherein said current in said second phase coil increases for a second predetermined period of time during said inactive stage of said second motor phase, said first predetermined period of time different than said second predetermined period of time.

11. The method of claim 10 wherein said level of said current in said first phase coil decreases for a third predetermined period of time during said inactive stage of said first motor phase and said current in said second phase coil decreases for a fourth predetermined period of time during said inactive stage of said second motor phase, said third predetermined period of time different than said fourth predetermined period of time.

12. A circuit for controlling a motor, comprising:

means for controlling a current in a first phase coil of a first motor phase of the motor during an active stage of said first motor phase; and, means for controlling a current in said first phase coil during an inactive stage of said first motor phase wherein a level of said current in said first phase coil increases for a first predetermined period of time during said inactive stage of said first motor phase.

13. The circuit of claim 12 wherein said level of current in said first phase coil decreases for a second predetermined period of time during said inactive stage of said first motor phase.

14. The circuit of claim 13 wherein said second predetermined period of time occurs before said first predetermined period of time.

15. The circuit of claim 13 wherein said level of current in said first phase coil decreases after said first and second predetermined periods of time.

16. The circuit of claim 12 wherein said means for controlling said current in said first phase coil during said inactive stage of said first motor phase includes a first one-shot circuit that generates a first output signal responsive to a phase control signal;

a second one-shot circuit that generates a second output signal responsive to said first output signal; and, a switch that controls said current in said phase coil responsive to said phase control signal and said second output signal.

17. The circuit of claim 16 wherein said means for controlling said current in said first phase coil during said inactive stage of said first motor phase further includes a logic gate that generates a drive signal responsive to said phase control signal and said second output signal, said switch responsive to said drive signal.

18. The circuit of claim 12, further comprising:

means for controlling a current in a second phase coil of a second motor phase of the motor during an active stage of said second motor phase; and, means for controlling a current in said second phase coil during an inactive stage of said second motor phase wherein a level of said current in said second phase coil increases for a second predetermined period of time during said inactive stage of said second motor phase, said second predetermined period of time different than said first predetermined period of time.

19. A circuit for controlling a motor, comprising:

a controller that generates a phase control signal;

a first one-shot circuit that generates a first output signal responsive to said phase control signal;

a second one-shot circuit that generates a second output signal responsive to said first output signal;

a logic gate that generates a drive signal responsive to said phase control signal and said second logic signal; and, a switch connected to a first phase coil of a first motor to phase of the motor and responsive to said drive signal.

20. The circuit of claim 19 wherein a level of current in said first phase coil increases for a predetermined period of time during an inactive stage of said first motor phase.

* * * * *

UNITED STATES PATENT AND TRADEMARK OFFICE
CERTIFICATE OF CORRECTION

PATENT NO.  : 5,920,176
DATED       : 07-06-99
INVENTOR(S) : Blackburn et al.

It is certified that error appears in the above-identified patent and that said Letters Patent is hereby corrected as shown below:

Column 10, line 55, please delete the word "to" after motor.

Signed and Sealed this

Ninth Day of November, 1999

Attest:

Q. TODD DICKINSON

Attesting Officer

Acting Commissioner of Patents and Trademarks